US012755571B2

(12) United States Patent
Otomo

(10) Patent No.: US 12,755,571 B2
(45) Date of Patent: Oct. 6, 2026

(54) DETECTION SYSTEM

(71) Applicant: Yazaki Corporation, Tokyo (JP)

(72) Inventor: Kentaro Otomo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 228 days.

(21) Appl. No.: 18/802,051

(22) Filed: Aug. 13, 2024

(65) Prior Publication Data

US 2024/0404318 A1 Dec. 5, 2024

Related U.S. Application Data

(63) Continuation of application No. PCT/JP2023/011442, filed on Mar. 23, 2023.

(30) Foreign Application Priority Data

Apr. 20, 2022 (JP) ................................ 2022-069254

(51) Int. Cl.
*G06V 40/00* (2022.01)
*G06T 7/11* (2017.01)
*G06V 20/59* (2022.01)
*G06V 40/16* (2022.01)

(52) U.S. Cl.
CPC .............. *G06V 40/162* (2022.01); *G06T 7/11* (2017.01); *G06V 20/59* (2022.01); *G06T 2207/10152* (2013.01); *G06T 2207/30201* (2013.01)

(58) Field of Classification Search
CPC .... G06V 40/162; G06V 20/59; G06V 10/143; G06V 10/141; G06V 40/16; G06T 7/11; G06T 2207/10152; G06T 2207/30201; G06T 7/00
See application file for complete search history.

(56) References Cited

U.S. PATENT DOCUMENTS

2006/0018641 A1* 1/2006 Goto ..................... B60R 25/302
396/4
2010/0254571 A1 10/2010 Matsuura et al.
2019/0089889 A1 3/2019 Yamamoto
2022/0222466 A1* 7/2022 Hassani ................. G06V 10/42

FOREIGN PATENT DOCUMENTS

EP 4020407 A1 * 6/2022 ........... G06V 40/168
EP 3979212 B1 * 3/2026 ......... G06Q 30/0621
JP 2008-2827 A 1/2008
JP 2009-116797 A 5/2009
JP 2017-188851 A 10/2017
JP 2019-57797 A 4/2019

* cited by examiner

*Primary Examiner* — Ping Y Hsieh
(74) *Attorney, Agent, or Firm* — Sughrue Mion, PLLC

(57) ABSTRACT

A detection system includes a light source section that includes a plurality of light emitting devices, each of the plurality of light emitting devices emitting near-infrared light toward a different portion of a face of an occupant of a vehicle, an imaging section that captures a face image with reflected light of the near-infrared light emitted to the face of the occupant, and a control unit that extracts feature points and a face image area of the face of the occupant from the face image captured by the imaging section. Based on a plurality of divided image areas obtained by dividing the face image area according to the plurality of light emitting devices, respectively, the control unit individually dims light from the light emitting devices corresponding to the respective divided image areas.

2 Claims, 11 Drawing Sheets

DETECTION SYSTEM

CROSS-REFERENCE TO RELATED APPLICATION(S)

This application is a continuation application of International Application No. PCT/JP2023/011442 filed on Mar. 23, 2023 which claims the benefit of priority from Japanese Patent Application No. 2022-069254 filed on Apr. 20, 2022 and designating the U.S., the entire contents of which are incorporated herein by reference.

BACKGROUND OF THE INVENTION

1. Field of the Invention

The present invention relates to a detection system.

2. Description of the Related Art

In recent years, in order to prevent drivers from being distracted while driving or falling asleep while driving, there has been disclosed, for example, a face image capturing device that captures an image of a face of a driver using a near-infrared camera and a near-infrared light source, and detects an orientation of the face, an opened or closed degree of an eye, a direction of a line of sight, or the like (see, for example, Japanese Patent Application Laid-open No. 2009-116797).

By the way, even if near-infrared light is emitted toward an entire face of a driver, reflected light from the face may not be uniform because a shadow is generated on a part of the face of the driver due to a sunshade used during daytime when external light (sunlight) enters the vehicle interior, the afternoon sun, or an external illumination during nighttime. Feature points of the face (e.g., a contour of the face, shapes and positions of eyes, a nose, and a mouth, and whether there are eyeglasses) can be detected from a face image obtained in such a situation, but a local object, e.g., an iris of an eye, has a larger difference in luminance value than a local object having a small difference in luminance value in a face area.

Therefore, there is concern that the accuracy of detection of the iris or the like of the eye may decrease, and there is room for further improvement in this respect.

SUMMARY OF THE INVENTION

An object of the present invention is to provide a detection system capable of suppressing a decrease in accuracy of detection of feature points of a face.

In order to achieve the above mentioned object, a detection system according to one aspect of the present invention includes a light source section including a plurality of light emitting devices, each of the plurality of light emitting devices being configured to emit near infrared light toward a different portion of a face of an occupant of a vehicle; an imaging section configured to capture a face image with reflected light of the near-infrared light emitted to the face of the occupant; and a control unit configured to detect feature points and a face image area of the face of the occupant from the face image captured by the imaging section, wherein based on a plurality of divided image areas obtained by dividing the face image area according to the plurality of light emitting devices, respectively, the control unit individually dims light from the light emitting devices corresponding to the respective divided image areas, and wherein the control unit includes; an extraction section configured to extract a measurement image area from each of the divided image areas based on the feature points included in each of the divided image areas; a calculation section configured to calculate an average value of pixel values based on all pixel values of a plurality of pixels included in each of the measurement image areas; a first storage section configured to store in advance, as a reference value corresponding to each of the divided image areas, an average value of pixel values based on all pixel values of a plurality of pixels included in each of the measurement image areas, which is obtained based on a face image captured under a referenced environment; a second storage section configured to store, as a measurement value corresponding to each of the divided image areas, an average value of pixel values based on all pixel values of a plurality of pixels included in each of the measurement image areas, which is obtained based on a face image captured under a measurement environment; and a dimming section configured to compare a difference of the reference value with respect to the measurement value with a threshold value, and reduces a light amount of the light emitting device corresponding to the divided image area when the difference is larger than or equal to the threshold value, or increases a light amount of the light emitting device corresponding to the divided image area when the difference is smaller than the threshold value, and wherein the measurement image area is formed based on a boundary line X that divides the face image area in Y direction, a boundary line Y that divides the face image area in X direction orthogonal to the Y direction, and end points in the X direction and the Y direction among the feature points included in each of the divided image areas.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a detection system according to the present invention will be described in detail with reference to the drawings. Note that the present invention is not limited by the following embodiment. That is, constituent elements in the following embodiment include those that can be easily assumed by those skilled in the art or those that are substantially the same, and various omissions, substitutions, and changes can be made without departing from the gist of the invention.

Embodiment

Figure 1:
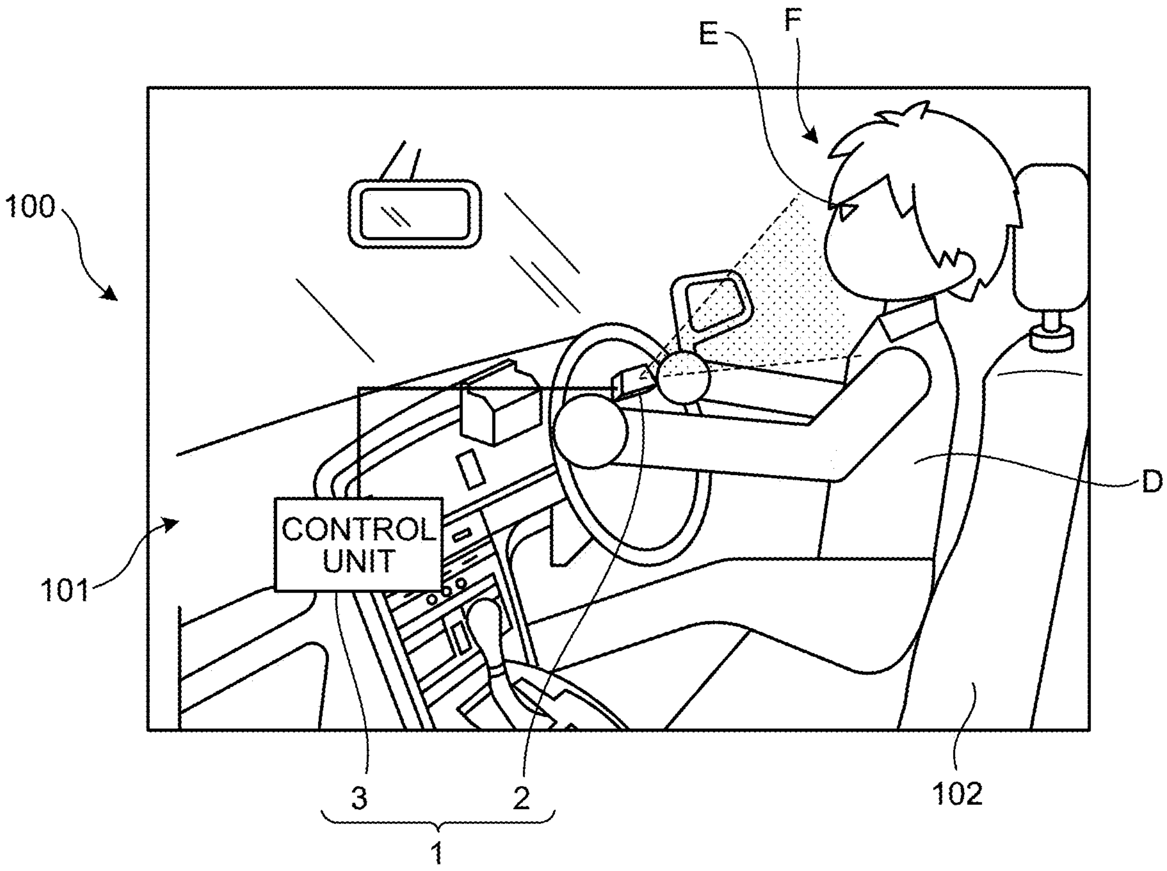
FIG. 1 is a schematic diagram illustrating an example in which a detection system according to an embodiment is applied to a vehicle.

A detection system according to the present embodiment will be described with reference to FIGS. 1 to 11. As illustrated in FIG. 1, a detection system 1 is mounted on, for example, a vehicle 100 such as an automobile to monitor a state of an eye of a driver D seated on a driver's seat 102 of the vehicle 100. The driver D is an occupant of the vehicle 100. The state of the eye includes a line-of-sight direction of the driver D, an opened/closed (blinking) state of the eye, or the like.

Figure 2:
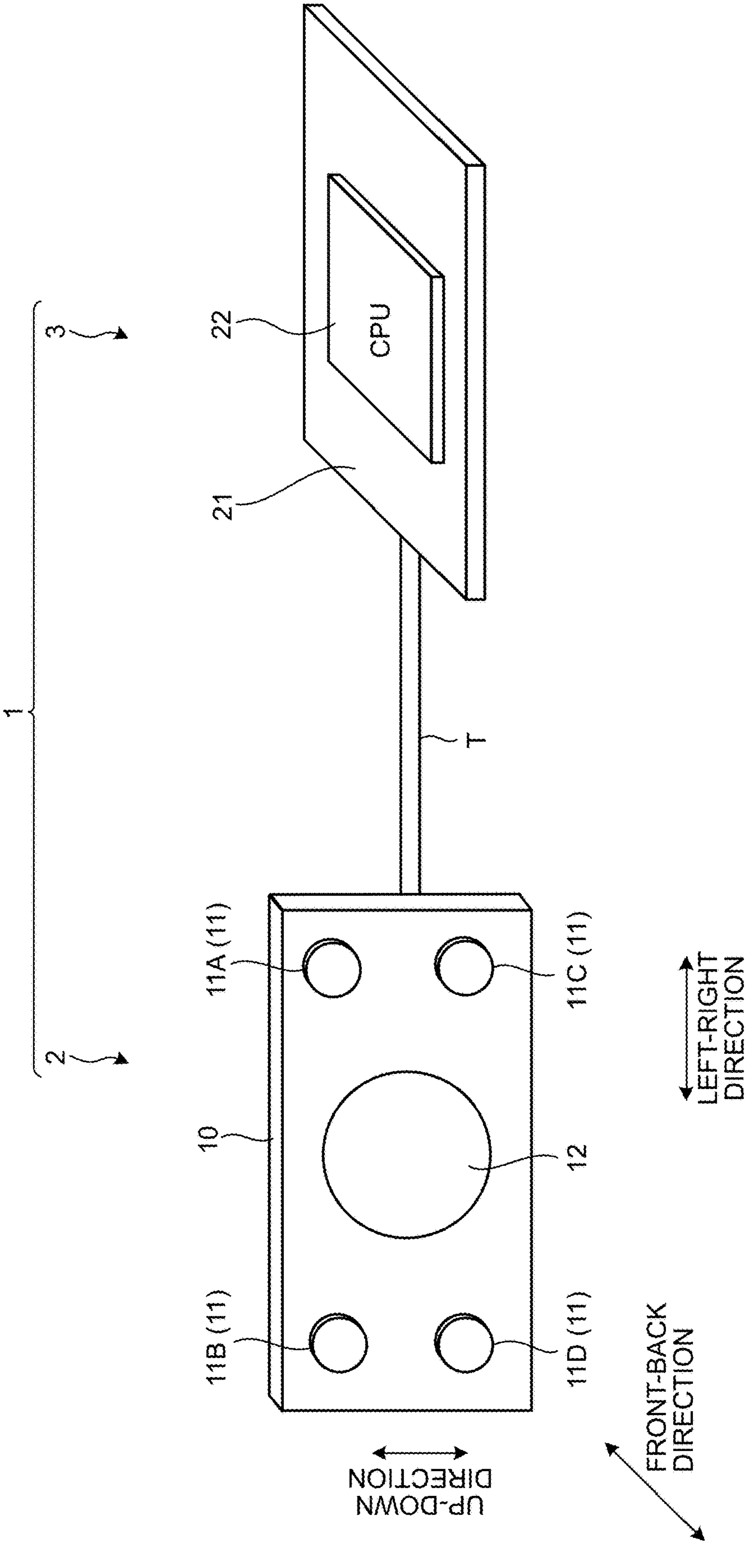
FIG. 2 is a schematic diagram illustrating a configuration example of the detection system according to the embodiment.

Note that the up-down direction used in the following description is an up-down direction of an imaging unit 2 constituting the detection system 1 as illustrated in FIG. 2. The front-back direction is a front-back direction of the imaging unit 2. The left-right direction is a left-right direction of the imaging unit 2.

For example, as illustrated in FIG. 1, the detection system 1 includes an imaging unit 2 and a control unit 3.

The imaging unit 2 emits near-infrared light to a face F of the driver D and captures face images 40 and 50 (see FIGS. 6 to 11) including eyes E of the driver D. The imaging unit 2 is installed at a position where the face images 40 and 50 of the driver D can be captured, for example, on a steering column or the like. The face images 40 and 50 are captured under different environments for the same subject (driver D).

The face image 40 is a face image of the driver D in which the face F of the driver D is imaged by the imaging unit 2 under a measurement environment. The measurement environment is, for example, an environment in which the driver D drives the vehicle 100 during daytime, nighttime, or the like. Under the measurement environment, there is a possibility that a shadow is generated on a part of the face F of the driver D, for example, due to external light (environmental light) entering a vehicle interior 101, a sunshade, or the like.

The face image 50 is captured under a referenced environment, and is, for example, an image registered at the time of using driving authentication or a face image of the driver D captured as calibration at the time of first use. The face image 50 is an image in which a luminance value of a face in the face image 50 is uniform. The referenced environment (reference environment) is an environment in which the luminance value of the face F in the face image 50 is uniform to some extent with respect to the measurement environment.

Specifically, the imaging unit 2 includes a board section 10, a light source section 11, and an imaging section 12.

The board section 10 constitutes an electronic circuit on which various electronic components are mounted and which electrically connects the electronic components, and is a so-called printed circuit board. In the board section 10, for example, a wiring pattern (printed pattern) is formed (printed) by a conductive member such as copper foil on an insulating layer made of an insulating material such as epoxy resin, glass epoxy resin, paper epoxy resin, or ceramic. The board section 10 is, for example, a multilayer obtained by stacking a plurality of insulating layers on which wiring patterns are formed (that is, a multilayer board). The board section 10 is formed in a rectangular shape, and the light source section 11 and the imaging section 12 are mounted on the board section 10 and are electrically connected to the board section 10.

Figure 3:
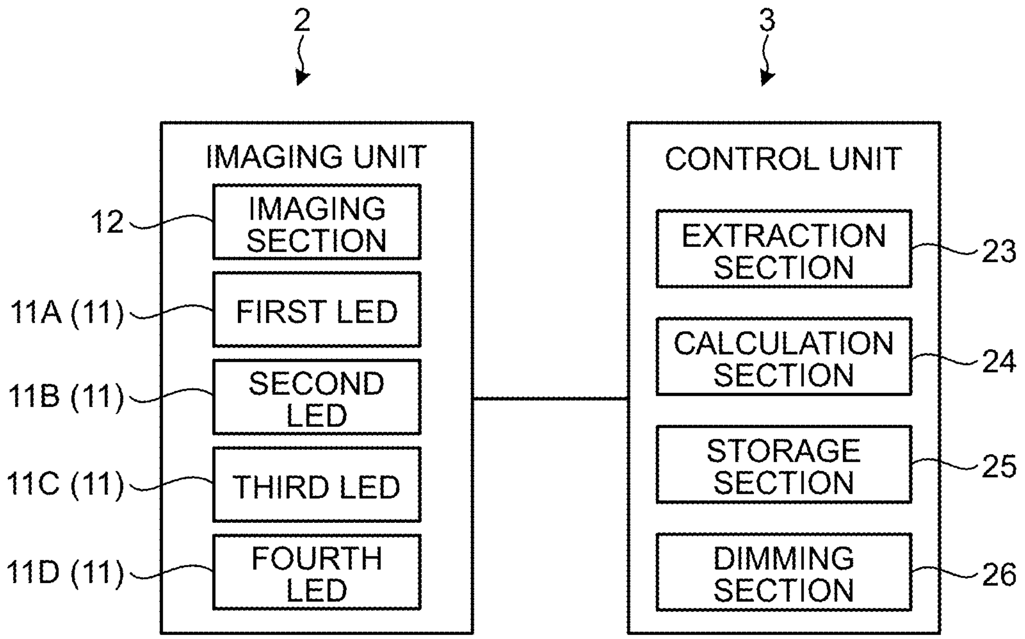
FIG. 3 is a block diagram illustrating the configuration example of the detection system according to the embodiment.

The light source section 11 emits near-infrared light. The light source section 11 emits, for example, near infrared rays under a control of the control unit 3. As illustrated in FIG. 3, the light source section 11 includes a first LED 11A, a second LED 11B, a third LED 11C, and a fourth LED 11D as a plurality of light emitting devices. The four LEDs, a first LED 11A to a fourth LED 11D, are mounted on the board section 10, and are provided on the board section 10 at intervals.

Figure 4:
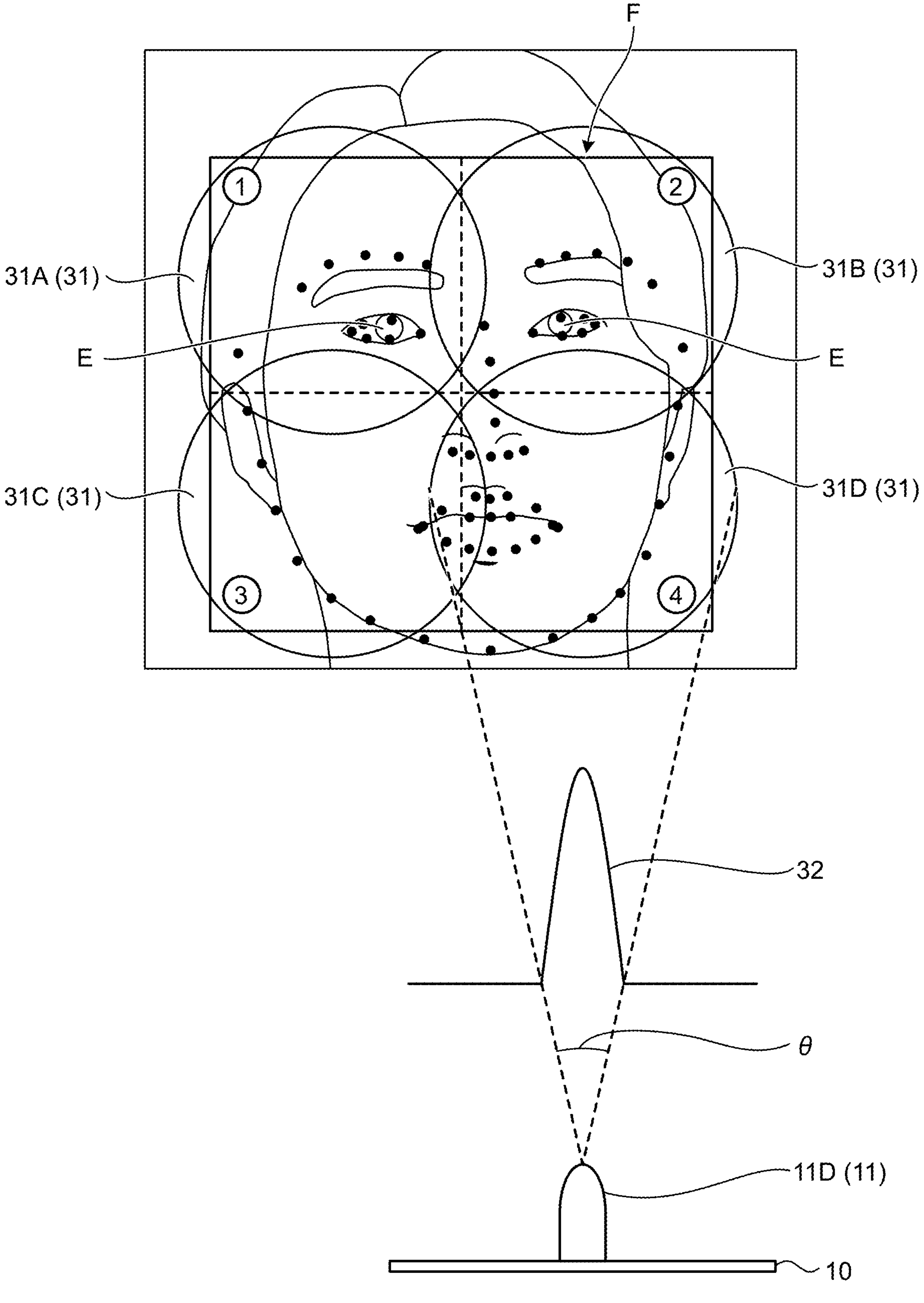
FIG. 4 is a diagram illustrating a correspondence relationship between an irradiation range of a light emitting device and a divided image area according to the embodiment.

As illustrated in FIG. 2, the four LEDs, the first LED 11A to the fourth LED 11D, are arranged in two rows along the left-right direction (width direction) of the board section 10, arranged in two columns along the up-down direction (height direction), and arranged at intervals in the left-right direction and in the up-down direction. Each of the four LEDs, the first LED 11A to the fourth LED 11D, emits near infrared light toward a different portion of the face F of the driver D of the vehicle 100. For example, as illustrated in FIG. 4, when the face F of the driver D exists substantially at the center of the imaging range of the imaging section 12, the four LEDs, the first LED 11A to the fourth LED 11D, are configured to emit near-infrared light to four irradiation ranges, a first irradiation range 31A, a second irradiation range 31B, a third irradiation range 31C, and a fourth irradiation range 31D, each of which is set according to the face F of the driver D. Each of the four LEDs, the first LED 11A to the fourth LED 11D, has an irradiation angle θ at which near-infrared light is emitted to the corresponding one of the first irradiation range 31A to the fourth irradiation range 31D. In addition, each of the four LEDs, the first LED 11A to the fourth LED 11D, is designed to have a certain degree of radiation intensity 32. As illustrated, the first irradiation range 31A to the fourth irradiation range 31D may overlap with each other.

The imaging section 12 captures the face image 40 with reflected light of near-infrared light emitted to the face F of the driver D. As illustrated in FIGS. 6 to 11, the face image 40 is an image including the face F of the driver D. The face image 40 may be a still image or a one-frame image obtained from a moving image. The imaging section 12 is, for example, a near infrared camera, and is mounted substantially at the center of the board section 10. As illustrated in FIG. 2, the imaging section 12 is disposed on the board section 10 at a position where a diagonal line passing the first LED 11A and the fourth LED 11D and a diagonal line passing the second LED 11B and the third LED 11C intersect. The imaging section 12 has a camera lens disposed to face the face F of the driver D to capture the face image 40 of the driver D. For example, the imaging section 12 receives reflected light of near-infrared light emitted to the face F of the driver D by the light source section 11 and captures the face image 40 of the driver D. The imaging section 12 is activated when an accessory (ACC) power supply or an ignition (IG) power supply of the vehicle is turned on to capture the face image 40 of the driver D until the ACC power supply or the IG power supply is turned off. The imaging section 12 is connected to the control unit 3 via the board section 10 or the like, and outputs the captured face image 40 of the driver D to the control unit 3.

The control unit 3 controls the imaging unit 2. The control unit 3 includes a control board 21 and a CPU22.

The control board 21 constitutes an electronic circuit on which various electronic components are mounted and which electrically connects the electronic components, and is a so-called printed circuit board. In the control board 21, for example, a wiring pattern is formed by a conductive member such as copper foil on an insulating layer made of an insulating material such as epoxy resin, glass epoxy resin, paper epoxy resin, or ceramic. The control board 21 is, for example, a multilayer obtained by stacking a plurality of insulating layers on which wiring patterns are formed (that is, a multilayer board). The CPU22 is mounted on the control board 21, and the CPU22 is electrically connected to the control board 21. In addition, the control board 21 is connected to the imaging unit 2 via a communication line T.

The CPU22 controls the imaging unit 2. The CPU22 includes, for example, an extraction section 23, a calculation section 24, a storage section 25, and a dimming section 26 illustrated in FIG. 3, and these functions are mounted on one integrated circuit (IC). Note that the extraction section 23 and the calculation section 24 constitute face recognition middleware.

Figure 6:
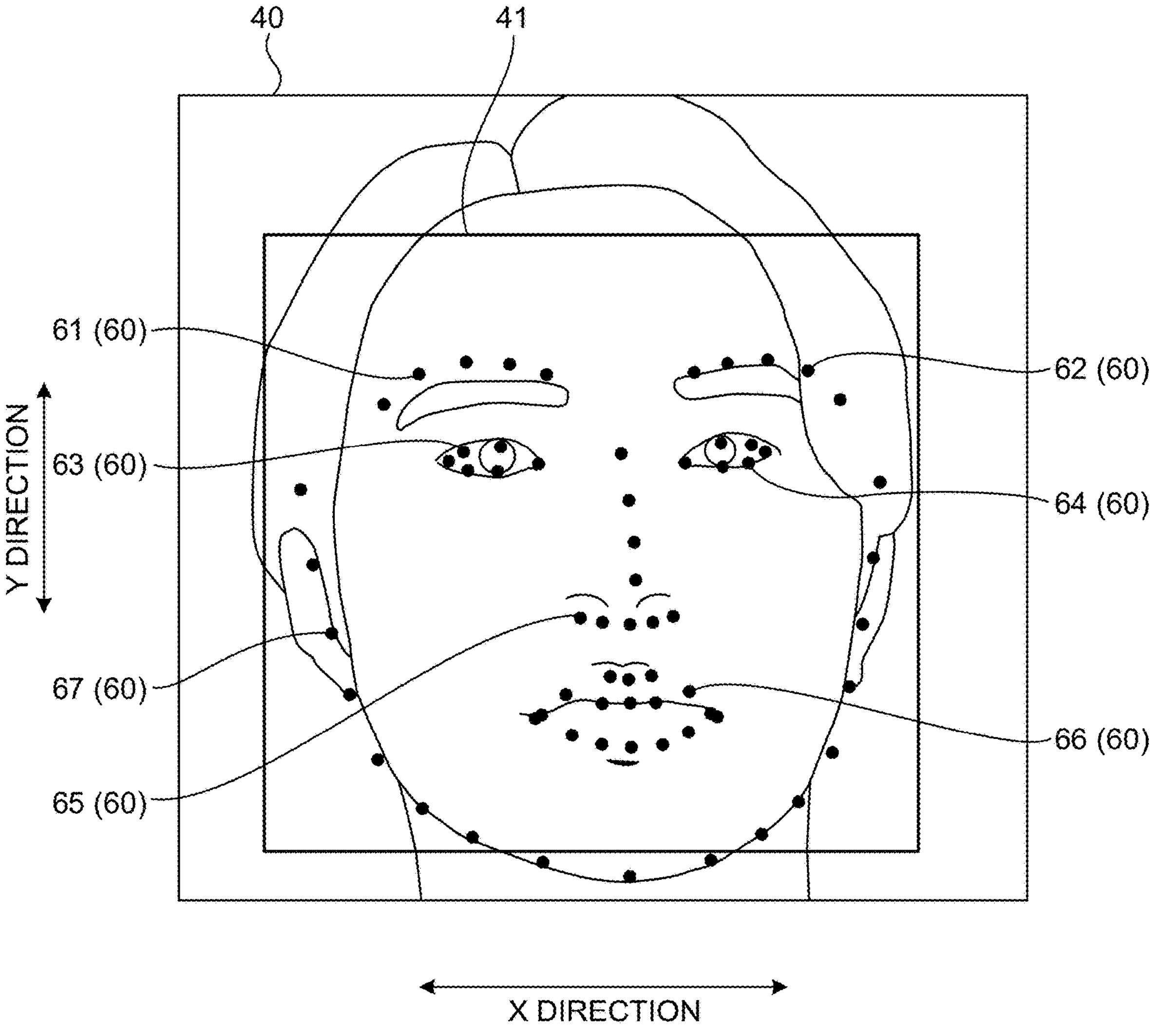
FIG. 6 is a diagram illustrating an example of a face image area and feature points in a face image captured under a measurement environment.

As illustrated in FIG. 6 (or FIG. 9), the extraction section 23 extracts a face image area 41 (or face image area 51) from the face image 40 (or face image 50) based on feature points 60 of the face F of the driver D. The face image areas 41 and 51 are rectangular frames each surrounding the face F of the driver D, and are also called “bounding boxes”. The feature points 60 of the face F are so-called “key points”, and include an eyebrow, an eye, a nose, a mouth, an outline, and the like. As illustrated in FIG. 6, the feature points 60 of the face F according to the present embodiment include a right eyebrow 61, a left eyebrow 62, a right eye 63, a left eye 64, a nose 65, a mouth 66, and an outline 67. The extraction section 23 extracts each of the feature points 60 of the face using a general face recognition algorithm. The face image area 41 is a rectangular area including the face F extracted from the face image 40. The extraction section 23 extracts the face image area 41 based on the plurality of feature points including the right eyebrow 61, the left eyebrow 62, the right eye 63, the left eye 64, the nose 65, the mouth 66, and the outline 67.

Figure 7:
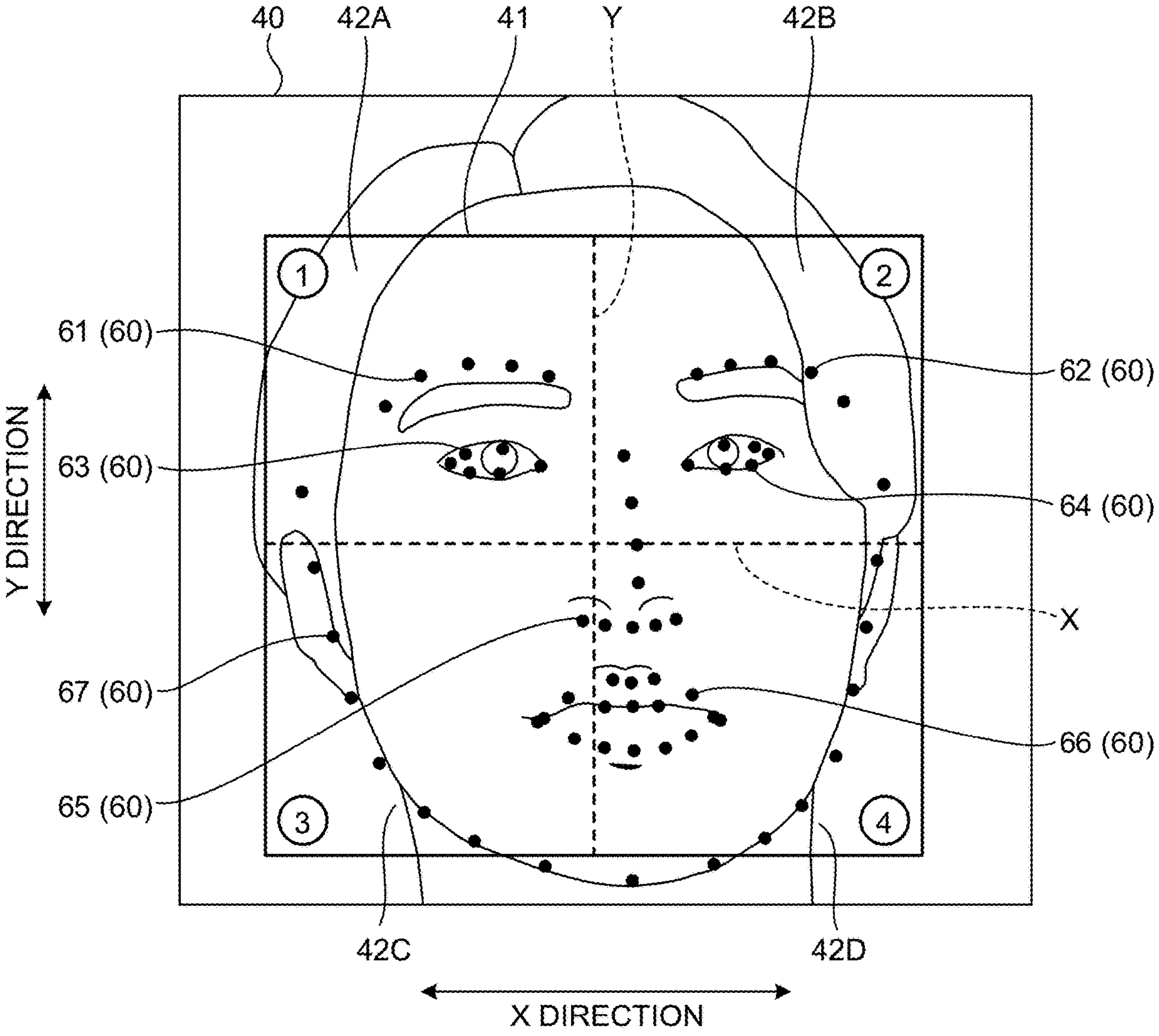
FIG. 7 is a diagram illustrating an example of divided image areas divided from the face image area in FIG. 6.

The extraction section 23 divides the extracted face image area 41 (or face image area 51) into four equal areas. Specifically, as illustrated in FIG. 7 (or FIG. 10), the extraction section 23 divides the face image area 41 into four divided image areas, a first divided image area 42A (first divided image area 52A), a second divided image area 42B (second divided image area 52B), a third divided image area 42C (third divided image area 52C), and a fourth divided image area 42D (fourth divided image area 52D), according to the four LEDs, the first LED 11A to the fourth LED 11D, respectively. The first divided image area 42A (first divided image area 52A) corresponds to the first LED 11A and the first irradiation range 31A. The second divided image area 42B (second divided image area 52B) corresponds to the second LED 11B and the second irradiation range 31B. The third divided image area 42C (third divided image area 52C) corresponds to the third LED 11C and the third irradiation range 31C. The fourth divided image area 42D (fourth divided image area 52D) corresponds to the fourth LED 11D and the fourth irradiation range 31D. All of the first divided image area 42A to the fourth divided image area 42D and the first divided image area 52A to the fourth divided image area 52D are formed in a rectangular shape.

The first divided image area 42A and the second divided image area 42B, and the third divided image area 42C and the fourth divided image area 42D are adjacent to each other in the X direction of the face image 40 (or face image 50) with a boundary line (equal division line) Y therebetween. In addition, the first divided image area 42A and the third divided image area 42C, and the second divided image area 42B and the fourth divided image area 42D are adjacent to each other in the Y direction of the face image 40 (or face image 50) with a boundary line (equal division line) X therebetween. Boundaries between the first divided image area 42A to the fourth divided image area 42D including the boundary lines X and Y are determined depending on the installed position of the imaging section 12, an irradiation range 31 of each LED, and the like.

Figure 8:
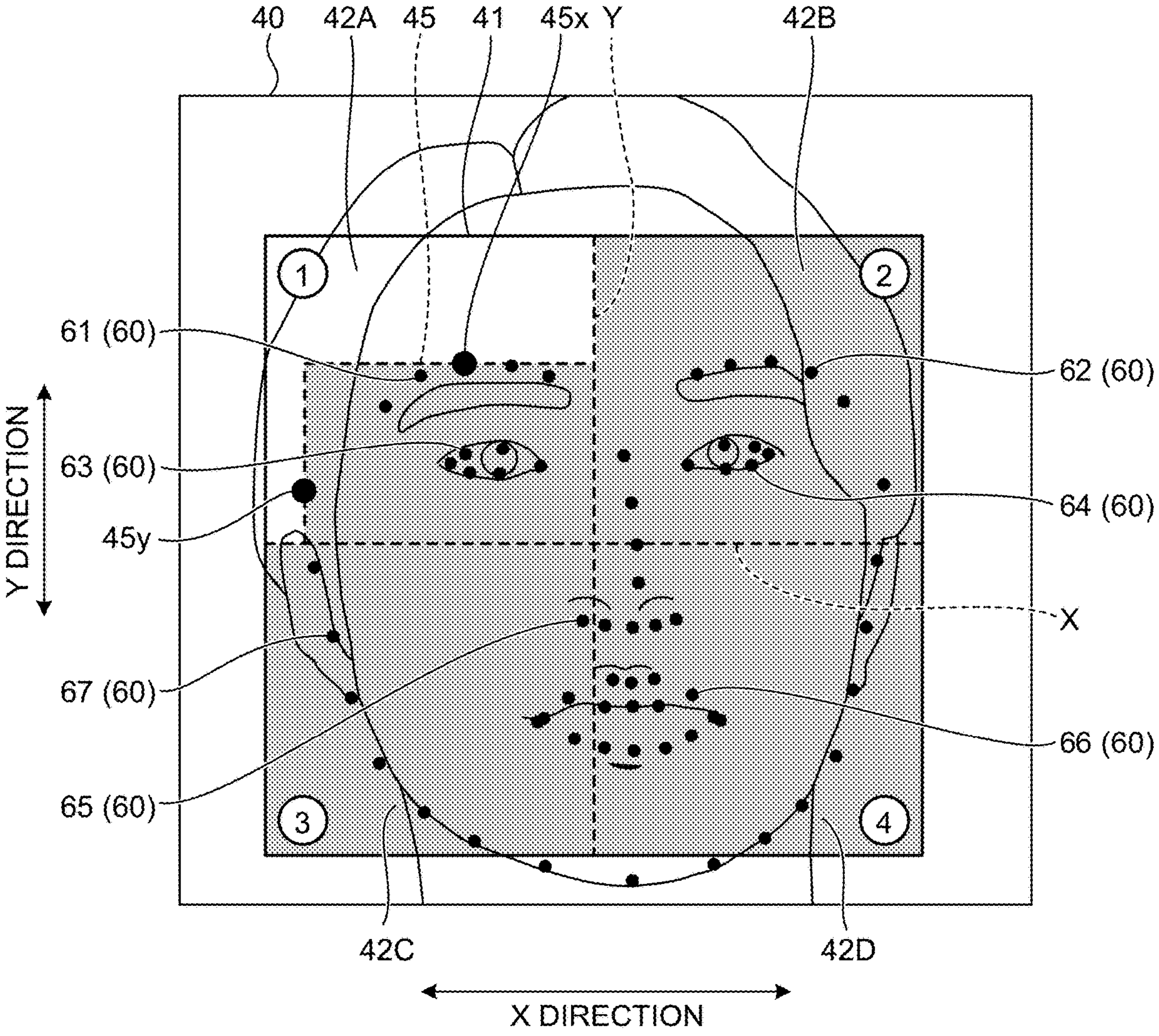
FIG. 8 is a diagram illustrating an example of a measurement image area extracted from the divided image area in FIG. 7.
Figure 9:
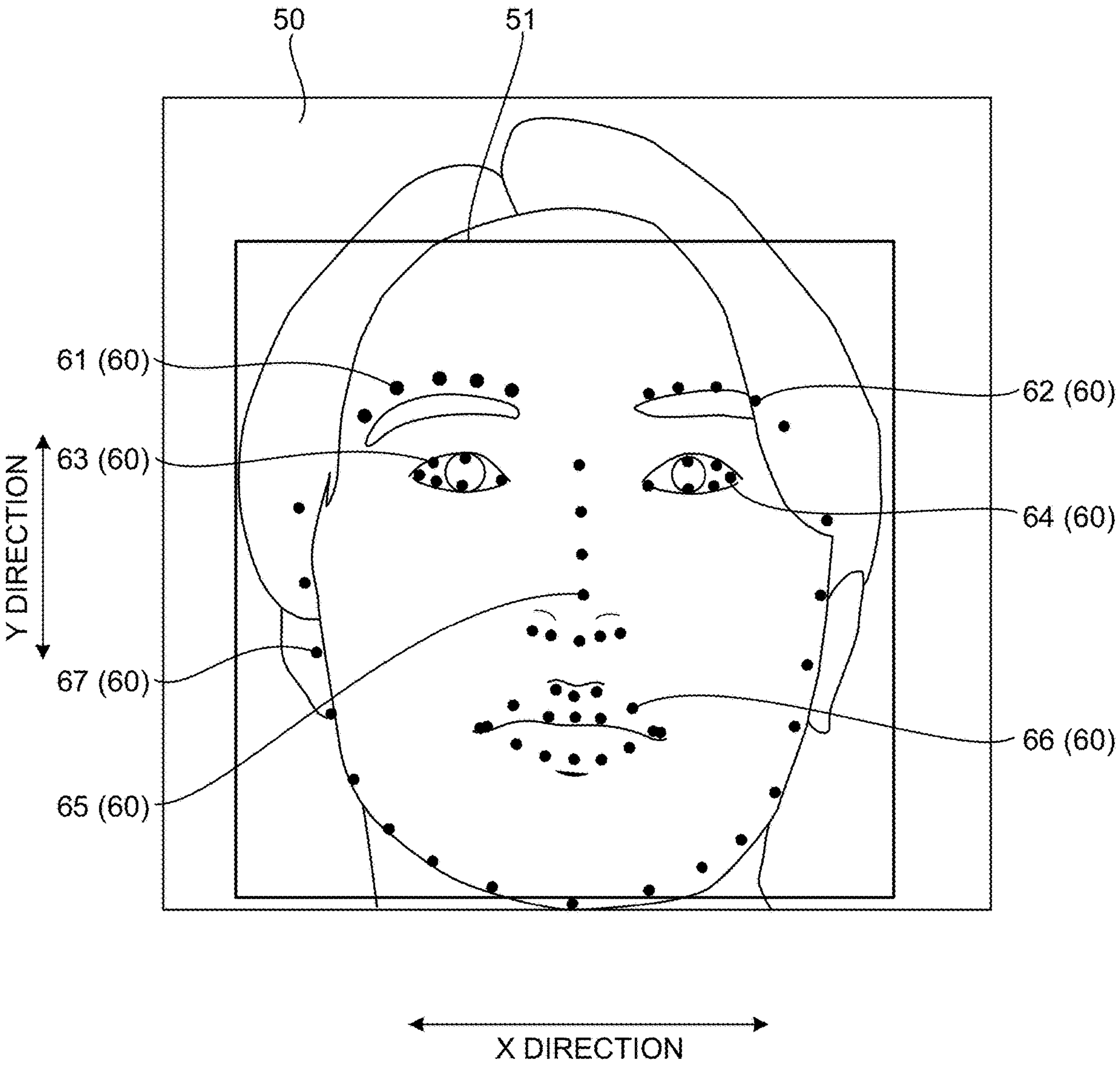
FIG. 9 is a diagram illustrating an example of a face image area and feature points in a face image captured under a reference environment.

As illustrated in FIG. 8 (or FIG. 10, FIG. 11), the extraction section 23 extracts a measurement image area 45 (or measurement image area 55) from each divided image area 42 (or each divided image area 52) based on the feature points 60 included in each of the first divided image area 42A to the fourth divided image area 42D (or the first divided image area 52A to the fourth divided image area 52D). The measurement image area 45 (or measurement image area 55) is a rectangular region formed based on end points 45*x* and 45*y* (or end points 55*x* and 55*y*) in the X direction and the Y direction among the feature points 60 included in each of the first divided image area 42A to the fourth divided image area 42D (or first divided image area 52A to fourth divided image area 52D) and the boundary lines X and Y. For example, the end point 45*x* (or end point 55*x*) is a feature point located at a position farthest from the boundary line X along the Y direction among the plurality of feature points 60 included in the first divided image area 42A (or first divided image area 52A). In addition, the end point 45*y* (or 55*y*) is a feature point located at a position farthest from the boundary line Y along the X direction among the plurality of feature points 60 included in the first divided image area 42A (or first divided image area 52A) The end points 45*x* and 45*y* (or 55*x* and 55*y*) are specified by the above-described method in the first divided image area 42A (or first divided image area 52A), but the end points are also specified by the above-described method in each of the second divided image area 42B to the fourth divided image area 42D (or second divided image area 52B to fourth divided image area 52D). In this manner, the measurement image area 45 (or 55) is extracted in each of the first divided image area 42A to the fourth divided image area 42D (or each of the first divided image area 52A to the fourth divided image area 52D). In each measurement image area 45 (or 55), a side passing the end point 45*x* (or 55*x*) is located parallel to the boundary line X, and a side passing the end point 45*y* (or 55*y*) is located parallel to the boundary line Y.

The calculation section 24 calculates an average value of pixel values based on all pixel values of a plurality of pixels included in each of at least two measurement image areas 45

(55) extracted by the extraction section 23. Specifically, the calculation section 24 stores the average value of pixel values based on all the pixels in each measurement image area 45 (55) in the storage section 25 as a measurement value (or reference value) corresponding to each of the first divided image area 42A to the fourth divided image area 42D (or each of the first divided image area 52A to the fourth divided image area 52D).

The storage section 25 stores the measurement value and the reference value calculated by the calculation section 24. The storage section 25 stores in advance the average value of pixel values based on all pixel values of a plurality of pixels included in the measurement image area 55, which is obtained based on the face image 50, as a reference value corresponding to each of the first divided image area 52A to the fourth divided image area 52D. In addition, the storage section 25 stores an average value of pixel values based on all pixel values of a plurality of pixels included in each of the first divided image area 42A to the fourth divided image area 42D, which is obtained based on the face image 40, as a measurement value corresponding to each of the first divided image area 42A to the fourth divided image area 42D.

The dimming section 26 causes the four LEDs, the first LED 11A to the fourth LED 11D, to emit light to perform dimming. The dimming section 26 causes all of the first LED 11A to the fourth LED 11D to emit light at a preset initial light amount. The dimming section 26 dims light from each of the first LED 11A to the fourth LED 11D. For example, the dimming section 26 can increase or decrease the light amount of the first LED 11A. The dimming section 26 performs dimming by increasing or decreasing the light amount of each of the first LED 11A to the fourth LED 11D based on the reference value corresponding to each of the first divided image area 52A to the fourth divided image area 52D and the measurement value corresponding to each of the first divided image area 42A to the fourth divided image area 42D stored in the storage section 25. The dimming section 26 compares a difference of a reference value with respect to the measurement value read from the storage section 25 with a threshold value. When the dimming section determines that the difference of the reference value with respect to the measurement value is larger than or equal to a first threshold value, the dimming section 26 determines that the corresponding divided image area 42 is too bright, and reduces the light amount of the first LED 11A to the fourth LED 11D corresponding to the first divided image area 42A to the fourth divided image area 42D. When the difference of the reference value with respect to the measurement value is smaller than or equal to a second threshold value, the dimming section 26 determines that the corresponding divided image area 42 is too dark, and increases the light amount of the first LED 11A to the fourth LED 11D corresponding to the first divided image area 42A to the fourth divided image area 42D. For example, the dimming section 26 can decrease or increase the light of only the first LED 11A corresponding to the first divided image area 42A among the four divided image areas, the first divided image area 42A to the fourth divided image area, according to the comparison result between the difference and the threshold value.

The relationship between the first threshold value and the second threshold value is first threshold value>second threshold value. When the difference between the reference value and the measurement value is zero (0), dimming is unnecessary. That is, when the difference is between the first threshold value and the second threshold value, it is not necessary for the dimming section 26 to decrease or increase light.

Figure 5:
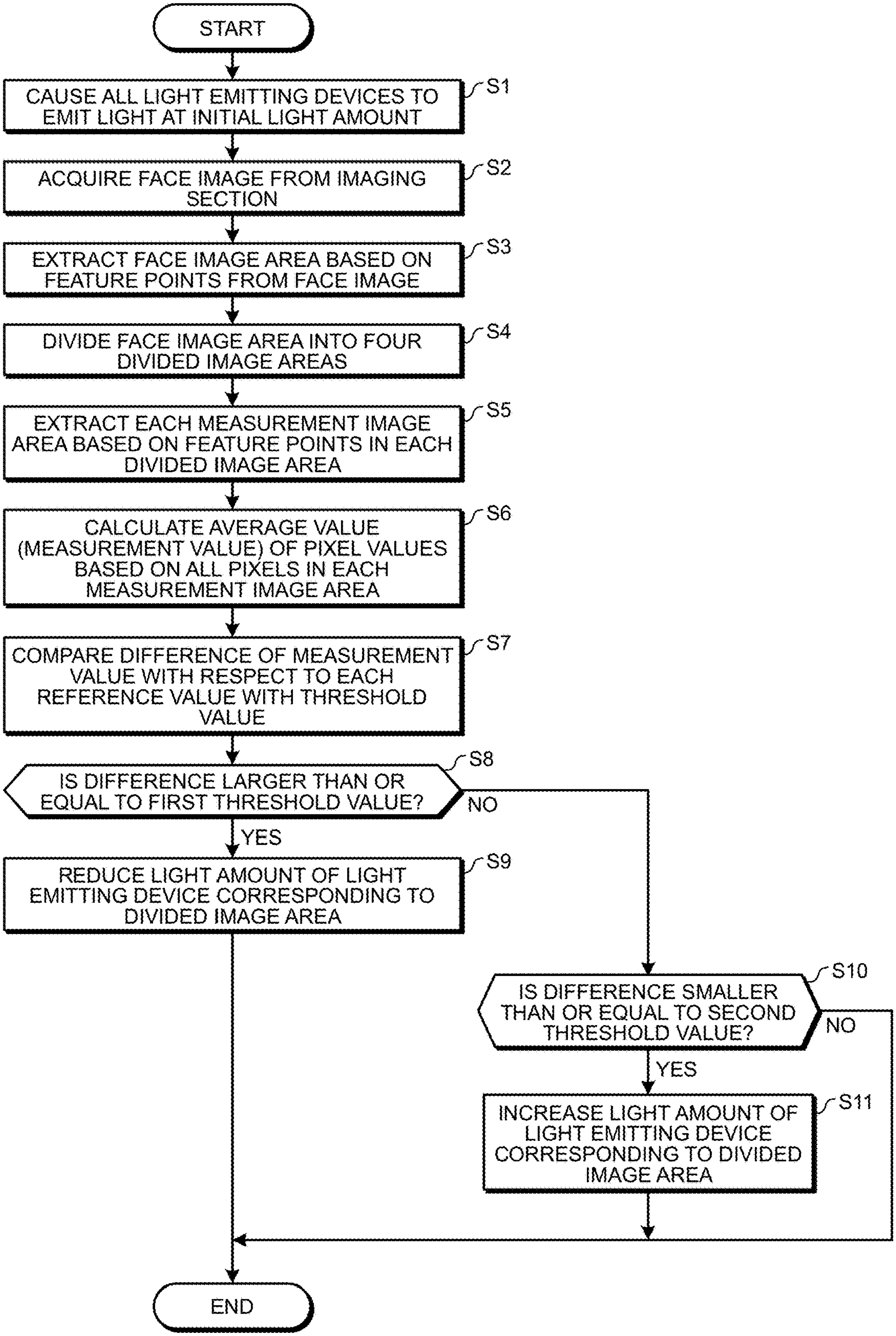
FIG. 5 is a flowchart illustrating an example of a dimming control of the detection system according to the embodiment.

Next, the control of the dimming of light from the light source section 11 in the detection system 1 will be described with reference to a flowchart of FIG. 5.

In step S1, the dimming section 26 causes all of the four LEDs, the first LED 11A to the fourth LED 11D, to emit light at a preset initial light amount, and emits near-infrared light to the face F of the driver D from each of the first LED 11A to the fourth LED 11D.

Next, in step S2, the imaging section 12 receives reflected light of the near-infrared light emitted to the face F of the driver D from all of the four LEDs, the first LED 11A to the fourth LED 11D, captures a face image 40 of the driver D, and outputs the captured face image 40 of the driver D to the control unit 3. The control unit 3 acquires the face image 40 of the driver D from the imaging section 12, and inputs the face image 40 to the face recognition middleware.

Next, in step S3, the extraction section 23 extracts a face image area 41 based on feature points 60 of the face F of the driver D from the face image 40 acquired in step S2.

Next, in step S4, the extraction section 23 divides the face image area 41 into four divided image areas, a first divided image area 42A to a fourth divided image area 42D.

Next, in step S5, the extraction section 23 extracts a measurement image area 45 based on the feature points 60 in each of the first divided image area 42A to the fourth divided image area 42D.

Next, in step S6, the calculation section 24 calculates an average value of pixel values based on all pixel values of a plurality of pixels included in each measurement image area 45, and stores the calculated average value in the storage section 25.

Next, in step S7, the dimming section 26 compares a difference of a reference value with respect to the measurement value read from the storage section 25 with a threshold value.

Next, in step S8, the dimming section 26 determines whether the difference is larger than or equal to a first threshold value. When it is determined that the difference is larger than or equal to the first threshold value, the dimming section 26 proceeds to step S9. On the other hand, when it is determined that the difference is not larger than or equal to the first threshold value, the dimming section 26 proceeds to step S10.

In step S9, the dimming section 26 reduces a light amount of an LED (at least one of the first LED 11A to the fourth LED 11D) corresponding to a divided image area in which the difference is larger than or equal to the first threshold value among the first divided image area 42A to the fourth divided image area 42D, and ends the present process.

In step S10, the dimming section 26 determines whether the difference is smaller than or equal to a second threshold value. When it is determined that the difference is smaller than or equal to the second threshold value, the dimming section 26 proceeds to step S11. On the other hand, when it is determined that the difference is not smaller than or equal to the second threshold value, the dimming section 26 ends the present process.

In step S11, the dimming section 26 increases a light amount of an LED (at least one of the first LED 11A to the fourth LED 11D) corresponding to a divided image area in which the difference is smaller than or equal to the second threshold value among the first divided image area 42A to the fourth divided image area 42D, and ends the present process.

The control unit 3 repeats the process from step S5 to step S11 until the dimming of light from the four LEDs, the first LED 11A to the fourth LED 11D, in the light source section 11 is completed. When dimming becomes unnecessary, the control unit 3 detects an iris or the like of an eye based on the face image 40 obtained at the timing when dimming becomes unnecessary. By doing so, a difference between luminance values in the face image area 41 decreases, as a result suppressing a decrease in accuracy of the detection of the feature points 60 of the face F.

As described above, the detection system 1 according to the present embodiment includes an imaging unit 2 including a light source section 11 and an imaging section 12, and a control unit 3. In the light source section 11, each of four LEDs, a first LED 11A to a fourth LED 11D, emits near infrared light toward a different portion of a face F of a driver D of a vehicle 100. The imaging section 12 captures a face image 40, 50 with reflected light of the near-infrared light emitted to the face F of the driver D from the light source section 11. The control unit 3 extracts feature points 60 of the face F of the driver D and a face image area 41 based on the captured face image 40, 50. The control unit 3 individually dims light from an LED corresponding to each face image area 41 based on four divided image areas, a first divided image areas 42A to a fourth divided image area 42D obtained by dividing the divided image area 42 according to the four LEDs, the first LED 11A to the fourth LED 11D, respectively.

With the above-described configuration, the detection system 1 can brighten an LED corresponding to a divided image area 42 in which a part of the face F of the driver D is shaded, for example, by a sunshade, or darken another LED corresponding to a divided image area 42 in which no shadow is generated. As a result, the detection system 1 can bring the face image 40 closer to the face image 50, reducing a change in brightness (luminance) of the entire face image area 41 obtained from the face image 40, as a result suppressing a decrease in accuracy of the detection of the feature points 60 of the face F. For example, in a case where the vicinity of the iris of the eye E in the face image area 41 is dark, the detection system 1 can suppress a decrease in accuracy of detection by increasing a light amount of a corresponding LED. In addition, the detection system 1 can dim light from the light source section 11 without changing the conventional device configuration. In addition, since the detection system 1 includes the light source section 11 that emits near-infrared light and the imaging section 12 that is a near-infrared camera, it is possible to acquire a face image 40 without requiring a large amount of light even at the time of capturing an image at nighttime or even in a case where the driver D wears sunglasses. In addition, the detection system 1 can reduce the power consumption by dimming light from the light source section 11, for example, during daytime, suppressing heat generation of the light source section 11, as a result extending the product life.

Some conventional driver monitoring systems adjust the amount of light by using a near-infrared light sensor that receives reflected light of near-infrared light emitted to an object (for example, Japanese Patent Application Laid-open No. S59-86973). In the above-described conventional technology, since the near-infrared light sensor is used to suppress a decrease in accuracy of detection, it is necessary to increase a component cost or to add a control circuit of the sensor. In contrast, the detection system 1 can suppress a decrease in accuracy of detection without using a near-infrared light sensor, thereby suppressing an increase in product cost.

In addition, in the detection system 1 according to the present embodiment, the dimming section 26 compares a difference of a reference value with respect to a measurement value with a threshold value whenever a face image 40 is captured under a measurement environment, and decreases a light amount of an LED corresponding to a divided image area 42 when the difference is larger than or equal to the threshold value, or increases a light amount of a light emitting device corresponding to a divided image area 42 when the difference is smaller than the threshold value. As a result, for example, in a case where the vicinity of the iris of the eye E in the face image area 41 is dark, a light amount of a corresponding LED can be increased, and in a case where the vicinity of the iris of the eye E in the face image area 41 is bright, a light amount of a corresponding LED can be decreased, so that it is possible to suppress a decrease in accuracy of detection of the iris of the eye or the like.

In the detection system 1 according to the present embodiment, the first divided image area 42A to the fourth divided image area 42D are rectangular areas divided equally according to the first irradiation range 31A to the fourth irradiation range 31D irradiated with near-infrared light by the first LED 11A to the fourth LED 11D, respectively. As a result, when the face image area 41 (or 51) has a rectangular shape, the face image area 41 (or 51) can be divided according to the positional relationship between each LED and each divided image area, making the correspondence between the plurality of divided image areas 42 (or 52) and the irradiation ranges 31 of the plurality of LEDs clear.

Note that, although the calculation section 24 calculates an average value of pixel values and a measurement value of a pixel value based on a measurement image area 45 (or 55) extracted by the extraction section 23 in the above-described embodiment, but the calculation section 24 is not limited thereto. For example, the calculation section 24 may be configured to calculate an average value of pixel values and a measurement value of a pixel value based on each of the first divided image area 42A to the fourth divided image area 42D (or each of the first divided image area 52A to the fourth divided image area 52D). As a result, the above-described effect can be obtained.

In addition, although the extraction section 23 extracts a face image area 41 based on the feature points 60 of the face F in the above-described embodiment, but the extraction section 23 is not limited thereto, and may extract feature points 60 of the face F based on the face image area 41.

Figure 10:
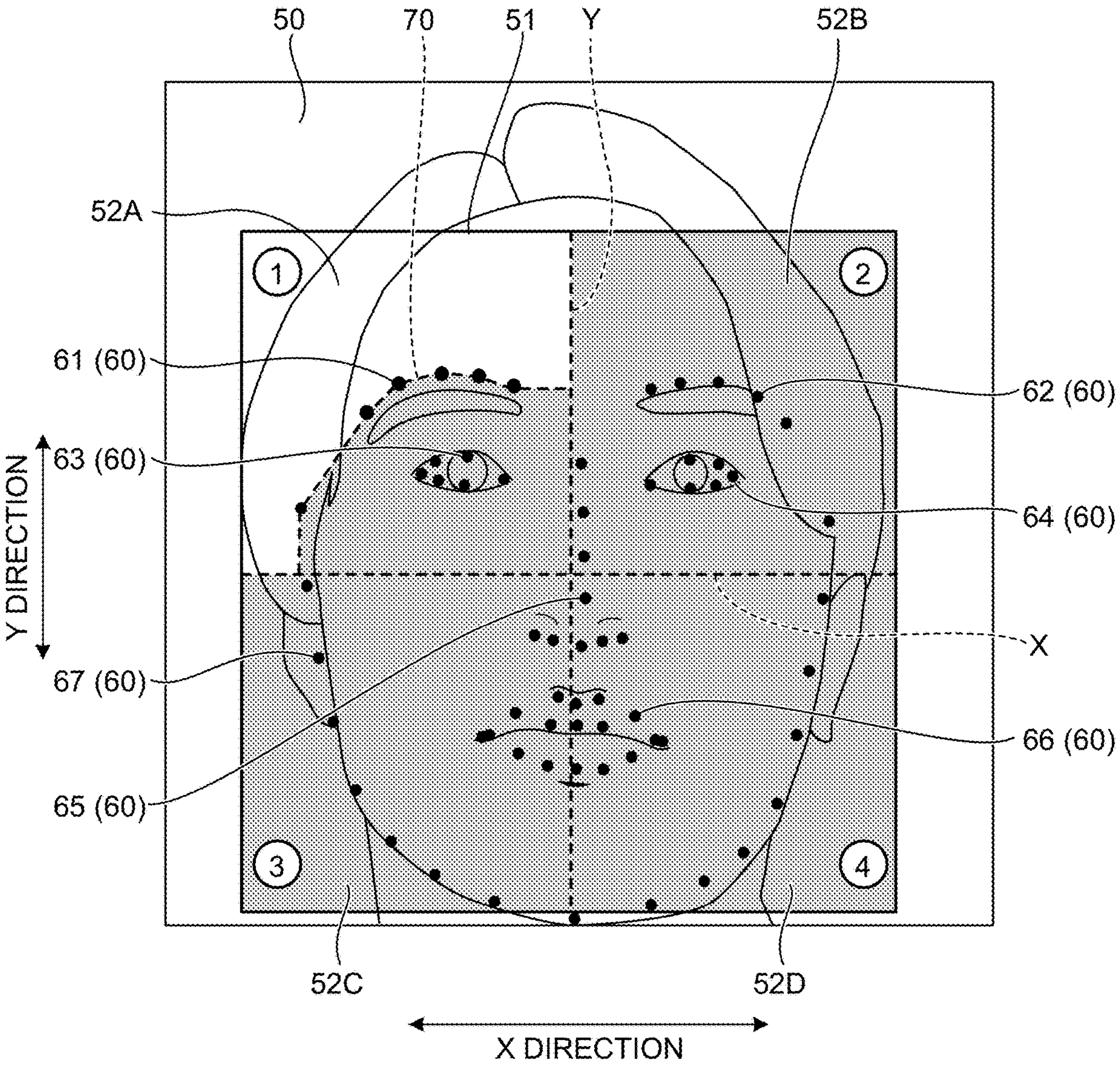
FIG. 10 is a diagram illustrating an example of divided image areas divided from the face image area in FIG. 9.
Figure 11:
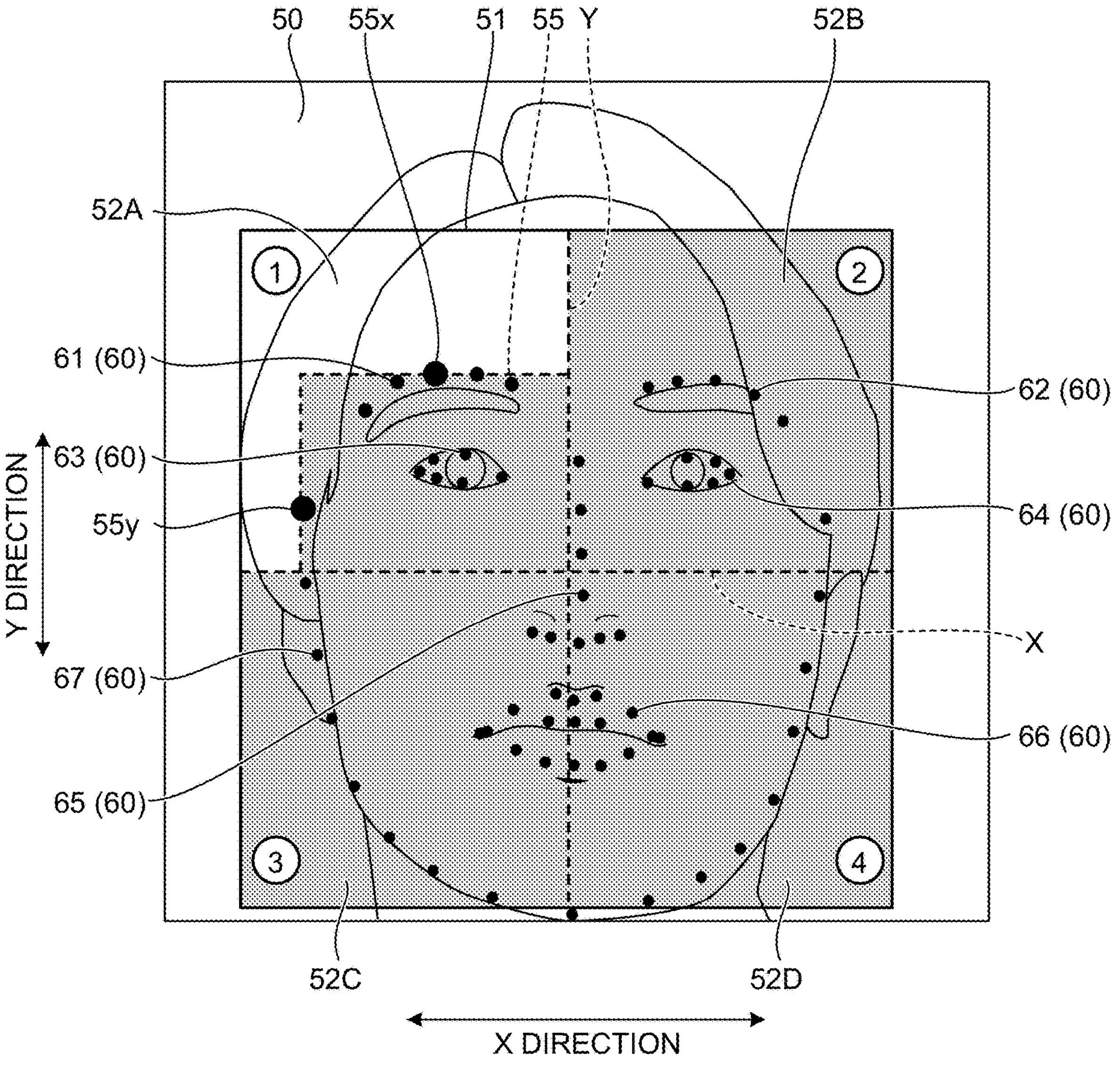
FIG. 11 is a diagram illustrating an example of a measurement image area extracted from the divided image area in FIG. 10.

In addition, although the measurement image area 45 (or 55) is a rectangular area in the above-described embodiment, the measurement image area 45 (or 55) is not limited thereto. For example, as illustrated in FIG. 10, the measurement image area 45 (or 55) may be formed by a line 70 connecting a plurality of feature points 60 to one another in each of the first divided image area 42A to the fourth divided image area 42D (or each of the first divided image area 52A to the fourth divided image area 52D) and the boundary lines X and Y, and is not limited as long as it is an area where a pixel value is calculated.

In addition, although the light source section 11 includes four LEDs, the first LED 11A to the fourth LED 11D, in the above-described embodiment, the light source section 11 is not limited thereto. The positions at the plurality of LEDs are arranged are determined depending on the installed position of the imaging section 12, the irradiation range 31 of each LED, and the like.

In addition, although the imaging unit 2 is installed on the steering column, the imaging unit 2 is not limited thereto, and may be installed on an instrument panel, a dashboard, a room mirror, or the like.

In addition, although it has been described as an example in the above-described embodiment that the CPU22 includes an extraction section 23, a calculation section 24, a storage section 25, and a dimming section 26, and these functions are mounted on one IC, the CPU22 is not limited thereto, and the aforementioned functions may be mounted on a plurality of ICs in a distributed manner.

In addition, although it has been described in the above-described embodiment that the processing functions of the control unit 3 are realized by a single processor, but the control unit 3 is not limited thereto. The processing functions of the control unit 3 may be realized by combining a plurality of independent processors and causing each of the processors to execute a program. In addition, the processing functions of the control unit 3 may be realized by a single processing circuit or a plurality of processing circuits in an appropriately distributed or integrated manner. In addition, all or some of the processing functions of the control unit 3 may be realized by a program, or may be realized as hardware by wired logic or the like.

In addition, although the detection system 1 is applied to the vehicle 100 such as an automobile in the above-described embodiment, but the detection system 1 is not limited thereto, and may be applied to, for example, a ship, an aircraft, or the like as well as the vehicle. In addition, the detection system 1 is divided into the imaging unit 2 and the control unit 3, but the imaging unit 2 and the control unit 3 may be integrally configured.

The detection system according to the present embodiment is advantageous in that based on a plurality of divided image areas obtained by dividing the face image area according to the plurality of light emitting devices, respectively, light from the light emitting devices corresponding to the respective divided image areas can be individually dimmed, thereby suppressing a decrease in accuracy of the detection of the feature points of the face.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection system comprising:

a light source section including a plurality of light emitting devices, each of the plurality of light emitting devices being configured to emit near infrared light toward a different portion of a face of an occupant of a vehicle;

an imaging section configured to capture a face image with reflected light of the near-infrared light emitted to the face of the occupant; and a control unit configured to detect feature points and a face image area of the face of the occupant from the face image captured by the imaging section, wherein based on a plurality of divided image areas obtained by dividing the face image area according to the plurality of light emitting devices, respectively, the control unit individually dims light from the light emitting devices corresponding to the respective divided image areas, and wherein the control unit includes;

an extraction section configured to extract a measurement image area from each of the divided image areas based on the feature points included in each of the divided image areas;

a calculation section configured to calculate an average value of pixel values based on all pixel values of a plurality of pixels included in each of the measurement image areas;

a first storage section configured to store in advance, as a reference value corresponding to each of the divided image areas, an average value of pixel values based on all pixel values of a plurality of pixels included in each of the measurement image areas, which is obtained based on a face image captured under a referenced environment;

a second storage section configured to store, as a measurement value corresponding to each of the divided image areas, an average value of pixel values based on all pixel values of a plurality of pixels included in each of the measurement image areas, which is obtained based on a face image captured under a measurement environment; and a dimming section configured to compare a difference of the reference value with respect to the measurement value with a threshold value, and reduces a light amount of the light emitting device corresponding to the divided image area when the difference is larger than or equal to the threshold value, or increases a light amount of the light emitting device corresponding to the divided image area when the difference is smaller than the threshold value, and wherein the measurement image area is formed based on a boundary line X that divides the face image area in Y direction, a boundary line Y that divides the face image area in X direction orthogonal to the Y direction, and end points in the X direction and the Y direction among the feature points included in each of the divided image areas.

2. The detection system according to claim 1, wherein the divided image areas are rectangular areas divided equally according to irradiation ranges of light emitted by the light emitting devices, respectively.

* * * * *